US012404030B2

(12) United States Patent
Murrow et al.

(10) Patent No.: US 12,404,030 B2
(45) Date of Patent: Sep. 2, 2025

(54) PROPULSION SYSTEM FOR AN AIRCRAFT

(71) Applicant: General Electric Company, Schenectady, NY (US)

(72) Inventors: Kurt David Murrow, Springboro, OH (US); Alexis Raquel Nunes, West Chester, OH (US)

(73) Assignee: General Electric Company, Evendale, OH (US)

( * ) Notice: Subject to any disclaimer, the term of this patent is extended or adjusted under 35 U.S.C. 154(b) by 635 days.

(21) Appl. No.: 17/007,026

(22) Filed: Aug. 31, 2020

(65) Prior Publication Data

US 2022/0063819 A1   Mar. 3, 2022

(51) Int. Cl.
*F02C 9/00* (2006.01)
*B64D 27/02* (2006.01)
*B64D 27/31* (2024.01)
*B64D 27/33* (2024.01)
*B64D 31/18* (2024.01)

(52) U.S. Cl.
CPC ............... *F02C 9/00* (2013.01); *B64D 27/31* (2024.01); *B64D 27/33* (2024.01); *B64D 31/18* (2024.01); *B64D 27/026* (2024.01); *F05D 2220/323* (2013.01); *F05D 2220/76* (2013.01); *F05D 2260/42* (2013.01); *F05D 2270/023* (2013.01); *F05D 2270/051* (2013.01); *F05D 2270/121* (2013.01); *F05D 2270/13* (2013.01); *F05D 2270/304* (2013.01)

(58) Field of Classification Search
CPC .............. B64D 2027/026; B64D 27/02; B64D 27/026; B64D 27/04; B64D 27/10; B64D 27/24; B64D 27/33; B64D 31/00; F02C 9/00; F02C 9/28; F02C 9/44; F05D 2220/323; F05D 2220/76; F05D 2260/42; F05D 2270/023; F05D 2270/051; F05D 2270/121; F05D 2270/13; F05D 2270/304
See application file for complete search history.

(56) References Cited

U.S. PATENT DOCUMENTS

| | | | |
|---|---|---|---|
| 4,805,396 | A | 2/1989 | Veerhusen et al. |
| 8,855,890 | B2 | 10/2014 | Egle et al. |
| 9,346,553 | B2 | 5/2016 | Gaulmin et al. |
| 9,676,488 | B2 | 6/2017 | Alber |
| 10,059,432 | B1 | 8/2018 | Lisio |
| 10,131,442 | B2 | 11/2018 | Waltner et al. |
| 10,569,759 | B2 | 2/2020 | Gansler et al. |

(Continued)

*Primary Examiner* — Jason H Duger
(74) *Attorney, Agent, or Firm* — Dority & Manning, P.A.

(57) ABSTRACT

A hybrid propulsion system for an aircraft can include a propulsor assembly having at least one propulsor and a power generation system. The power generation system can include a first power assembly, a second power assembly, a first electric machine, and a second electric machine. The first power assembly can be drivingly coupled to the first electric machine to produce a first amount of electric power. The second power assembly can be drivingly coupled to the second electric machine to produce a second amount of electric power. A controller can be operably coupled to the first power assembly, the first electric machine, or both and to the second power assembly, the second electric machine, or both. The controller can be configured to combine at least a portion of the first and second amount of power for electric transfer to the propulsor assembly.

9 Claims, 8 Drawing Sheets

(56) References Cited

U.S. PATENT DOCUMENTS

| | | | |
|---|---|---|---|
| 10,822,099 B2 | 11/2020 | Barone et al. | |
| 11,673,661 B2 | 6/2023 | Vondrell et al. | |
| 11,873,110 B2 | 1/2024 | Hon et al. | |
| 2011/0256973 A1 | 10/2011 | Werner et al. | |
| 2011/0281679 A1* | 11/2011 | Larrabee | B64D 35/08 |
| | | | 903/910 |
| 2013/0133480 A1 | 5/2013 | Donnelly | |
| 2015/0013306 A1* | 1/2015 | Shelley | F02K 5/00 |
| | | | 60/224 |
| 2016/0083104 A1 | 3/2016 | Simonetti et al. | |
| 2017/0260872 A1* | 9/2017 | Munevar | H02P 3/06 |
| 2017/0327219 A1 | 11/2017 | Alber | |
| 2018/0009542 A1* | 1/2018 | Kuster | B64D 31/06 |
| 2018/0065739 A1 | 3/2018 | Vondrell et al. | |
| 2018/0079515 A1* | 3/2018 | Harwood | B64D 27/24 |
| 2018/0251228 A1* | 9/2018 | Sands | B64D 27/02 |
| 2018/0281931 A1* | 10/2018 | Miller | B64D 27/18 |
| 2019/0002113 A1* | 1/2019 | Gansler | F01D 15/10 |
| 2019/0302710 A1 | 10/2019 | Neti et al. | |
| 2020/0023982 A1 | 1/2020 | Kupratis et al. | |
| 2020/0031480 A1* | 1/2020 | Baig | B60L 50/61 |

\* cited by examiner

PROPULSION SYSTEM FOR AN AIRCRAFT

FIELD

The present subject matter relates generally to a hybrid aircraft propulsion system and a method for operating various propulsor assemblies of the propulsion system.

BACKGROUND

An aircraft generally includes a propulsion system that provides thrust. The propulsion system can include at least two aircraft engines. Each engine is typically mounted to a respective one of the wings of the aircraft or at other practicable locations. While a gas turbine engine is lighter and can produce more thrust than an internal combustion engine, the internal combustion engine may have better fuel burn characteristics. Accordingly, a propulsion system capable of operating utilizing the particular benefits of each type of engine would be useful.

BRIEF DESCRIPTION

Aspects and advantages of the invention will be set forth in part in the following description, or may be obvious from the description, or may be learned through practice of the invention.

In some embodiments of the present disclosure, a hybrid propulsion system for an aircraft that includes a propulsor assembly having at least one propulsor. A power generation system includes at least a first power assembly, a second power assembly, a first electric machine, and a second electric machine. The first power assembly is drivingly coupled to the first electric machine to produce a first amount of electric power. The second power assembly is drivingly coupled to the second electric machine to produce a second amount of electric power. The second power assembly is configured to generate electric power more efficiently than the first power assembly. A power bus is coupled to the first electric machine and the second electric machine. A controller is operably coupled to the first power assembly, the first electric machine, or both and to the second power assembly, the second electric machine, or both. The controller and the power bus are configured to combine at least a portion of the first amount of electrical power and the second amount of electrical power to supply the propulsor assembly.

In some embodiments of the present disclosure, a method for operating a hybrid propulsion system of an aircraft is provided herein. The hybrid propulsion system includes a first power assembly operably coupled with a first electric machine, a second power assembly operably coupled with a second power assembly, and a propulsor assembly. The propulsor assembly includes at least one propulsor and is operably coupled to at least one of the first electric machine and the second electric machine. The method includes receiving, by one or more computing devices, a command to provide a first amount of thrust output for a first operating condition. The method also includes providing, by the one or more computing devices, a first amount of electrical power from the first electric machine to provide the first thrust output from the first power assembly to the propulsor assembly. Further, the method includes receiving, by the one or more computing devices, a command to provide a second amount of thrust output for a second operating condition. The method further includes providing, by the one or more computing devices, a second amount of electrical power from the second electric machine to provide the second thrust output from the second power assembly to the propulsor assembly.

In some embodiments of the present disclosure, a hybrid propulsion system for an aircraft includes a first power assembly having a turbomachine coupled to a first electric machine. The hybrid propulsion system also includes second power assembly having an internal combustion engine coupled to a second electric machine. A propulsor assembly has a first motor operably coupled to a first propulsor. The propulsor assembly is selectively powered by the first and second electric machines through a power bus that is coupled to the first electric machine and the second electric machine. A controller is operably coupled to the first power assembly, the first electric machine, or both and to the second power assembly, the second power assembly, or both. If a desired thrust output is within a second power assembly operating range, the second power assembly is activated. If the desired thrust output is greater than the second power assembly operating range, the first power assembly is activated.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
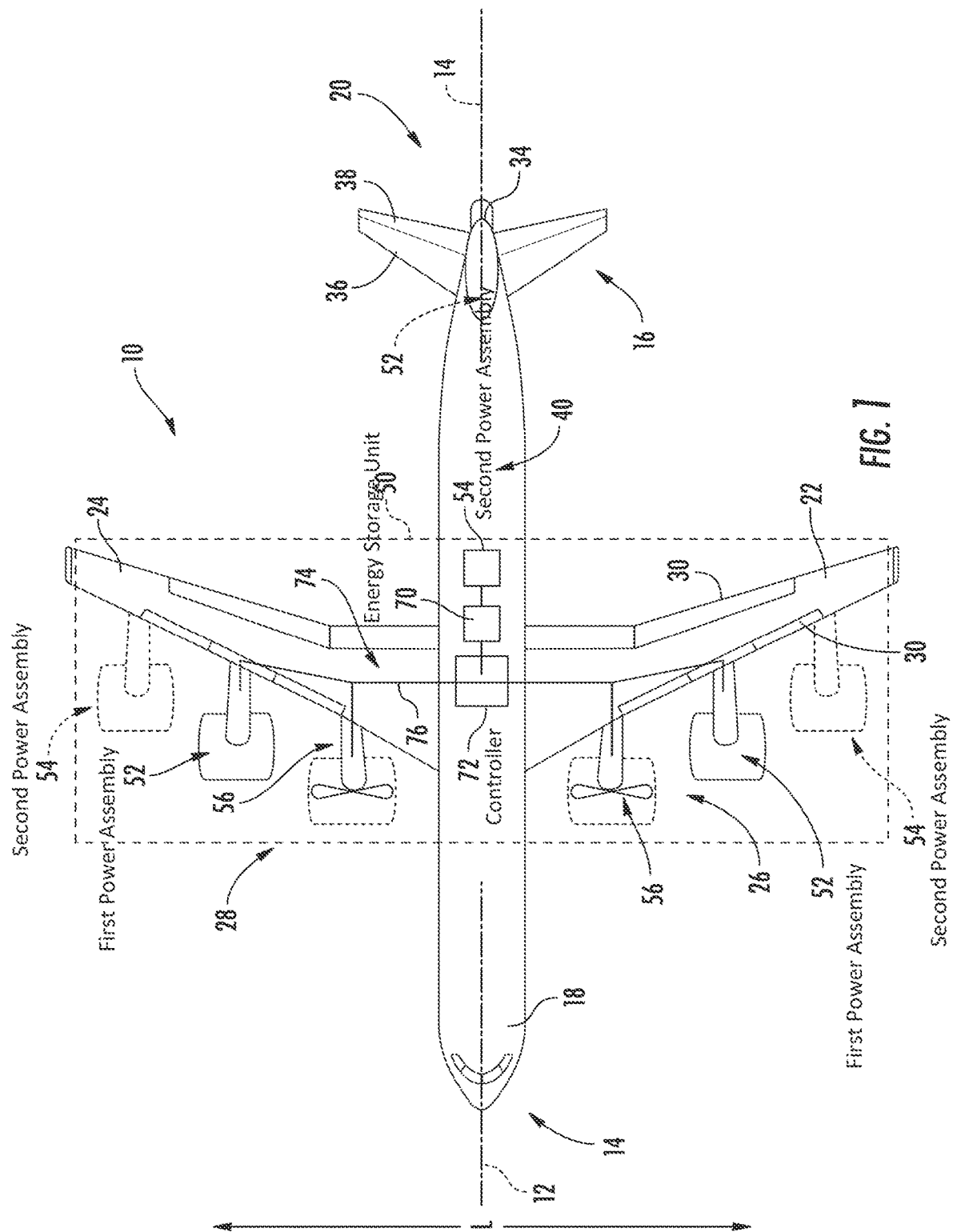
FIG. 1 is a schematic view of a propulsion system architecture of an aircraft having in accordance with various aspects of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "and/or," when used in a list of two or more items, means that any one of the listed items can be employed by itself, or any combination of two or more of the listed items can be employed. For example, if a composition or assembly is described as containing components A, B, and/or C, the composition or assembly can contain A alone; B alone; C alone; A and B in combination; A and C in combination; B and C in combination; or A, B, and C in combination.

Generally, the present disclosure provides for a hybrid propulsion system for an aircraft that includes one or more propulsor assemblies. For instance, the hybrid propulsion system can include A hybrid propulsion system for an aircraft is provided herein that can include a propulsor assembly having at least one propulsor and a power generation system. The power generation system can include a first power assembly, a second power assembly, a first electric machine, and a second electric machine. The first power assembly can be drivingly coupled to the first electric machine to produce a first amount of electric power. The second power assembly can be drivingly coupled to the second electric machine to produce a second amount of electric power.

In some embodiments, a controller can be operably coupled to the first power assembly, the first electric machine, or both and to the second power assembly, the second power assembly, or both. The controller can be configured to combine at least a portion of the first and second amount of power for electric transfer to the propulsor assembly. The controller can also be configured to provide electrical power from the first electric machine to the propulsor assembly in a first operating condition and from the second electric machine to the propulsor assembly in a second operating condition. In some instances, the first operating condition may be indicated by a command to accelerate or climb the aircraft and the second operating condition may be indicated by a command to operate the aircraft in a level flight condition. Additionally, or alternatively, in various embodiments, the controller can be configured to receive a desired thrust output, and if a desired thrust output is within a second power assembly operating range, activating the second power assembly, and if the desired thrust output is greater than the second power assembly operating range, activating the first power assembly.

In some instances, the first power assembly may be deactivated when the aircraft is in the second operating condition and the second power assembly may be deactivated when the aircraft is in the first operating condition. Additionally, or alternatively, one of the first and second propulsor assemblies may be utilized to provide a desired amount of thrust for the aircraft while the other of the first and second power assembly may simultaneously be used for generating electric power for one or more power loads of the aircraft.

In various embodiments, the first electric machine and the second electric machine are both configured to generate electrical power that is stored within the energy storage unit. In some cases, the second electric machine may be configured to generate less electrical power than the first electric machine. For instance, the second electric machine can generate less than half of the electrical power of the first electric machine.

In some embodiments, an energy storage unit can be operably coupled with each of the first power assembly, the second power assembly, and the propulsor assembly. Each of the first power assembly, the second power assembly, and the propulsor assembly can be configured to utilize electrical power stored in the energy storage unit.

By operating in accordance with one or more these aspects, the hybrid propulsion system provided herein may provide a sufficient amount of thrust output to the aircraft at each operating condition of the aircraft (e.g., takeoff, cruise, loiter, etc.) while operating in an efficient manner. For instance, the hybrid propulsion system provided herein may use a first power assembly that incorporates a lightweight, high specific power engine (e.g., a constant combustion engine) for takeoff and/or dash conditions and a second power assembly that incorporates a high efficiency, low specific power engine (e.g., an intermittent combustion engine) for long-duration cruise/loiter conditions. In addition, the hybrid propulsion system may further incorporate a propulsor assembly that uses a partial or full electrical drive-train that can enable the combination of power from disparate plants in order to drive one or more propulsors. The one or more propulsors may be positioned in any practicable location about the aircraft. In various embodiments, through one or more computing systems, various configurations of thrust outputs may occur when each of the one or more propulsors is switched on or off, based on the system power demand, and the propulsor assembly can compensate for the hybrid propulsion system as one power assembly is brought up to speed during a power transition.

In some embodiments, the first power assembly may be configured as a gas turbine that is lighter than the second power assembly based on a weight/pounds of thrust capable of being produced ratio and can produce more electric power and/or thrust than the second power assembly. Conversely, the second power assembly may be configured as an internal combustion engine that is heavier than the first power assembly based on a weight/pounds of thrust capable of being produced ratio, but may have better fuel burn characteristics than the first power assembly. By creating a hybrid propulsion system that utilizes the first power assembly for the high power take-off or high-speed conditions but relies (possibly solely) upon the second power assembly for cruise or loiter conditions may increase the aircraft capability while improving the overall mission duration. In some instances, the hybrid propulsion system provided herein may lead to double digit range improvements for a multi-gas turbine architecture and range doubling for a diesel-gas turbine architecture when compared to a single gas turbine architecture.

A system architecture that combines multiple engine types and uses each engine for the part of the mission where it is most efficient results in increased performance and reduced fuel burn throughout the mission. The amount of benefit from the combined architecture is based on the duration aloft, making the disclosed architecture beneficial for prolonged endurance applications. Any extended capability and reduced fuel burn is both a commercial and military advantage over currently available propulsion systems.

Referring now to the drawings, wherein identical numerals indicate the same elements throughout the figures, FIG. 1 generally provides a schematic view of an aircraft 10 that may incorporate various features of the present disclosure. As shown in FIG. 1, the aircraft 10 defines a longitudinal centerline 12 that extends therethrough, a lateral direction L, a forward end portion 14, and an aft end portion 16. Moreover, the aircraft 10 includes a fuselage 18, extending longitudinally from the forward end portion 14 of the aircraft 10 to the aft end portion 16 of the aircraft 10, and an empennage 20 at the aft end portion of the aircraft 10.

The aircraft 10 can also include a wing assembly including a first, port side wing 22 and a second, starboard side wing 24. The first and second wings 22, 24 each extend laterally outward with respect to the longitudinal centerline 12. The first wing 22 and a portion of the fuselage 18 together define a first side 26 of the aircraft 10, and the second wing 24 and another portion of the fuselage 18 together define a second side 28 of the aircraft 10. For the embodiment depicted, the first side 26 of the aircraft 10 is configured as the port side of the aircraft 10, and the second side 28 of the aircraft 10 is configured as the starboard side of the aircraft 10.

Each of the wings 22, 24 for the embodiment depicted includes one or more flaps 30, which may be in the form of leading-edge flaps and one or more trailing-edge flaps. The aircraft 10 further includes, or rather, the empennage 20 of the aircraft 10 includes, a vertical stabilizer 34 which may have a rudder flap for yaw control, and a pair of horizontal stabilizers 36, each having an elevator flap 38 for pitch control. The fuselage 18 additionally includes an outer surface or skin 40. It will be appreciated, however, that in other embodiments of the present disclosure, the aircraft 10 may additionally or alternatively include any other suitable configuration. For example, in other embodiments, the aircraft 10 may include any other configuration of stabilizer.

Moreover, it will be appreciated that in some embodiments, the aircraft 10 may be configured as a vertical takeoff and landing (VTOL) aircraft, a helicopter, or any other type of aerial vehicle without departing from the scope of the present disclosure.

In some embodiments, the aircraft 10 may be an unmanned aerial vehicle capable of flight without a human pilot aboard. For example, the aircraft 10 may be piloted by, e.g., remote control by a human operator, or alternatively, may be fully or intermittently autonomous and controlled by onboard and/or offboard computers.

Figure 2:
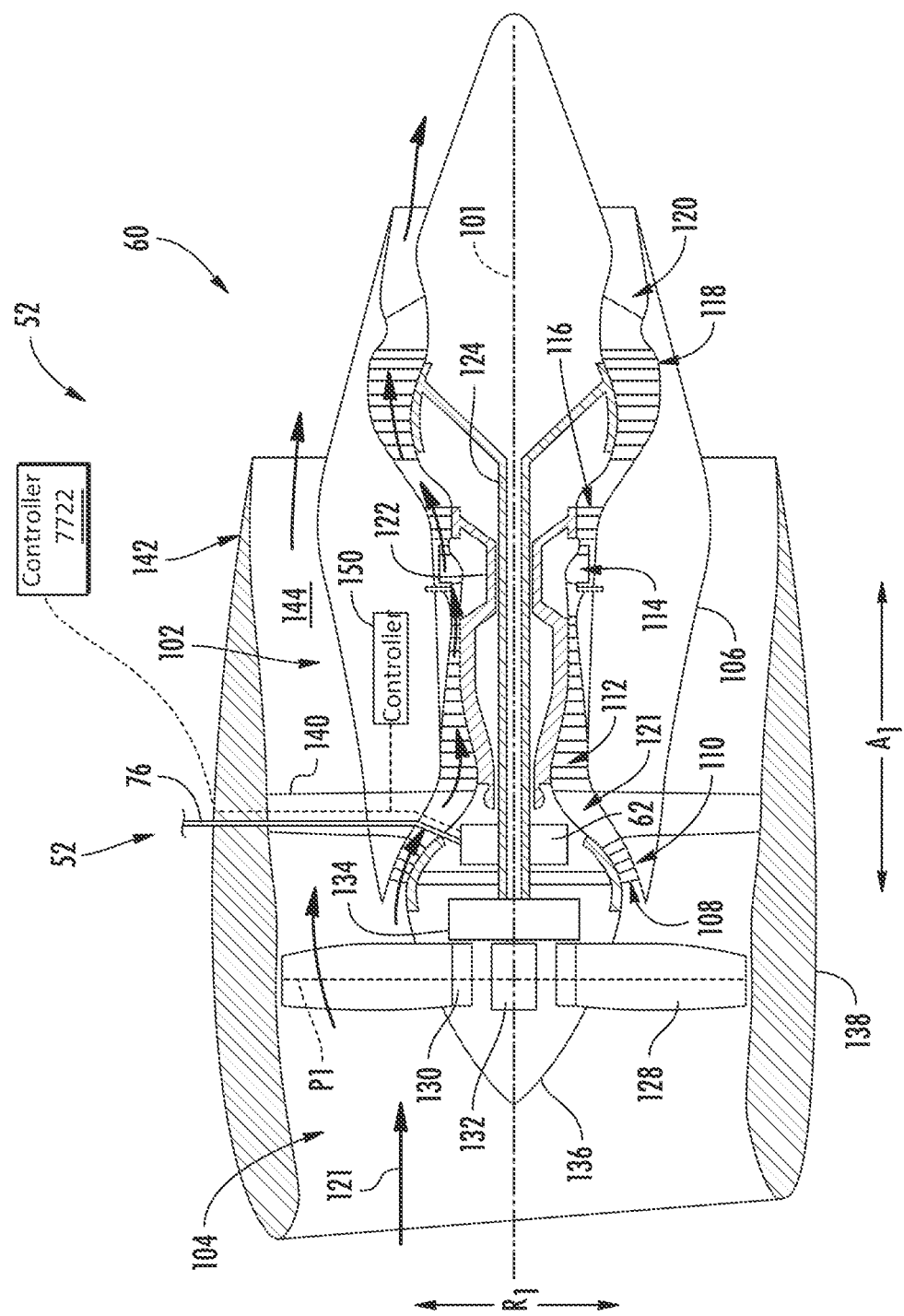
FIG. 2 is a schematic, cross-sectional view of a gas turbine engine mounted to the aircraft of FIG. 1 in accordance with various aspects of the present disclosure.
Figure 3:
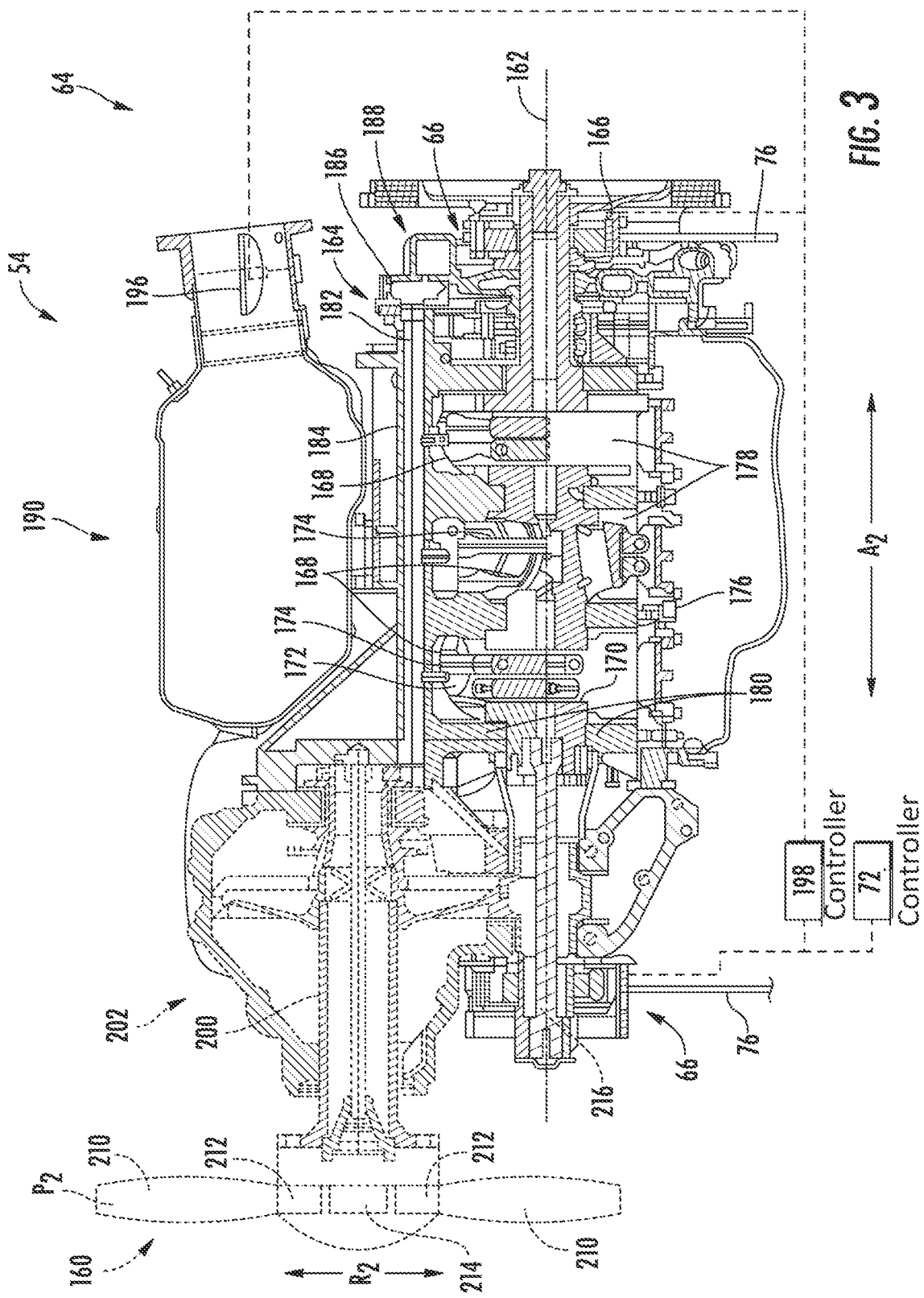
FIG. 3 is a schematic, cross-sectional view of an internal combustion engine mounted to the aircraft of FIG. 1 in accordance with various aspects of the present disclosure.
Figure 4:
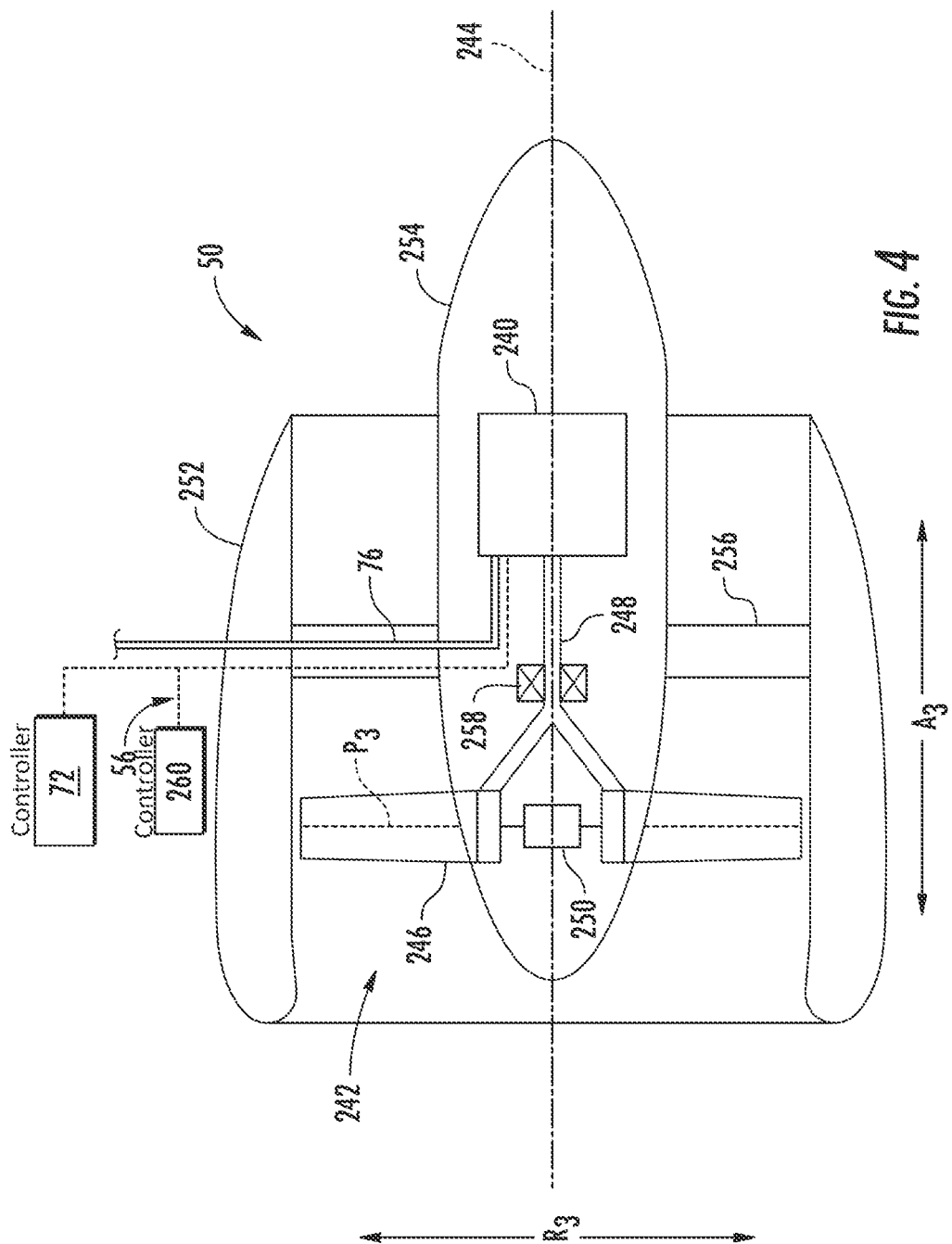
FIG. 4 is a schematic, cross-sectional view of a propulsor assembly mounted to the aircraft of FIG. 1 in accordance with various aspects of the present disclosure.

Referring to FIGS. 1-4, the aircraft 10 of FIG. 1 can include a hybrid propulsion system 50 having a power generation assembly 32, which can include a first power assembly 52 and/or a second power assembly 54, and one or more propulsor assemblies 56. As used herein, "hybrid" can indicate any propulsion system that includes more than one type of power source. For instance, in various embodiments, the power generation assembly 32 can include turbine engines (e.g., continuous combustion or continuous rotation engines), internal combustion engines (e.g., intermittent combustion or reciprocating engines), electric machines and/or any other type of machine that can generate electrical power and/or propulsive force for the aircraft 10. For example, FIG. 2 provides a schematic, cross-sectional view of a first power assembly 52, FIG. 3 provides a schematic, cross-sectional view of a second power assembly 54, and FIG. 4 provides a schematic, cross-sectional view of a propulsor assembly 56 that can be operably coupled with the first and/or the second power assembly 52, 54. In various embodiments, each of the first and/or second power assemblies 52, 54 may each be configured in an underwing-mounted configuration and produce electrical power and/or thrust in varied manners. Additionally, and/or alternatively, the first and/or the second power assemblies 52, 54 may be operably coupled with the fuselage of the aircraft 10, or in any coupled with the aircraft 10 in any other manner. In addition, the propulsor assembly may also be configured in an underwing-mounted configuration (or in any other practical configuration) and provide thrust in response to receiving electrical power from the power generation assembly 32 (and/or an energy storage unit 70). In some embodiments, at least one of the first power assembly 52 or the second power assembly 54 can be supported by a wing 22, 24 of the aircraft 10 and at least one of the first power assembly 52 or the second power assembly 54 can be supported by a fuselage 18 of the aircraft 10.

Referring generally to FIGS. 1 through 4, in some embodiments, the hybrid propulsion system 50 can generally be configured such that the first power assembly 52 has a turbomachine (and, possibly, a prime propulsor (which, for the embodiment of FIG. 2 are configured together as a gas turbine engine, or rather as a turbofan engine 60)), a first electric machine 62 (which for the embodiment depicted in FIG. 2 is an electric motor/generator) drivingly coupled to the turbomachine, the second power assembly 54 (which, for the embodiment of FIG. 3 is configured as an internal combustion engine 64), a second electric machine 66 (which for the embodiment depicted in FIG. 3 is an electric motor/generator) drivingly coupled to the internal combustion engine 64, the propulsor assembly 56 (which for the embodiment of FIG. 4 is configured as an electric motor assembly), an electric energy storage unit 70 (electrically connectable to the first electric machine 62, the second electric machine 66, and/or the propulsor assembly 56), a controller 72, and a power bus 74. The propulsor assembly 56, the electric energy storage unit 70, the first electric machine 62, and the second electric machine 66 are each electrically connectable to one another through one or more electric lines 76 of the power bus 74. For example, the power bus 74 may include various switches or other power electronics 78 movable to selectively electrically connect the various components of the hybrid propulsion system 50. Additionally, the power bus 74 may further include power electronics 78, such as inverters, converters, rectifiers, etc., for conditioning or converting electrical power within the hybrid propulsion system 50. In some instances, at least one of the first power assembly 52 or the second power assembly 54 is further configured to provide thrust for the aircraft 10 when the at least one of the first power assembly 52 or the second power assembly 54 is in operation As will be appreciated, the controller 72 may be configured to distribute electrical power between the various components of the hybrid propulsion system 50. For example, the controller 72 may be operable with the power bus 74 (including the one or more switches or other power electronics 78) to provide electrical power to or draw electrical power from, the various components, such as the first electric machine 62, the second electric machine 66, and/or the motor of the propulsor assembly 56, to operate the hybrid propulsion system 50 between various conditions and perform various functions. Such is depicted schematically as the electric lines 76 of the power bus 74 extending through the controller 72. In some instances, the controller 72 can be configured to provide a desired thrust output from the propulsion assembly 56. In some instances, electrical power is provided from the first power assembly 52 to the propulsion assembly 56 in response to receiving a command to operate in a first operating condition (such as to accelerate or climb the aircraft 10) and from the second power assembly 54 to the propulsion assembly 56 in response to receiving a command to operate in a second condition (such as to operate in a level flight condition, an idle condition, or a loiter condition). In some instances, the first power assembly 52 may be deactivated when the aircraft 10 is in the second operating condition and the second power assembly 54 may be deactivated when the aircraft 10 is in the first operating condition. Additionally, or alternatively, one of the first and second propulsor assemblies may be utilized to provide a desired amount of thrust for the aircraft 10 while the other of the first and second power assembly 54 may simultaneously be used for generating electric power for one or more power loads 272 (FIG. 6) of the aircraft 10. Additionally, or alternatively, the controller 72 can be configured to receive a desired thrust output, and if the desired thrust output is within a second power assembly operating range, activate the second power assembly 54, and if the desired thrust output is greater than the second power assembly operating range, activate the first power assembly 52. In some instances, both of the first and second power assemblies 52, 54 may generate electrical power simultaneously that can be used by the propulsion assembly 56.

The controller 72 may be a stand-alone controller, dedicated to the hybrid propulsion system 50, or alternatively, may be incorporated into one or more of a main system controller for the aircraft 10, a separate controller for the turbofan engine 60 (such as a full authority digital engine control system for the turbofan engine 60, also referred to as a FADEC), a separate controller for the internal combustion engine 64 (such as a FADEC), etc. For example, the controller 72 may be configured in substantially the same manner as the computing system 500 described below with reference to FIG. 8 (and may be configured to perform one or more of the functions of the method 300, described below).

The electric energy storage unit 70 may be configured as one or more batteries, one or more capacitors, or any other suitable electrical energy storage devices. It will be appreciated that for the hybrid propulsion system 50 described herein, the electric energy storage unit 70 is configured to store a relatively large amount of electrical power. For example, in various embodiments, the electric energy storage unit may be configured to store at least about fifty kilowatt-hours of electrical power, such as at least about sixty-five kilowatt-hours of electrical power, such as at least about seventy-five kilowatts hours of electrical power, and up to about one thousand kilowatt-hours of electrical power.

Referring now to FIGS. 1 and 2, the first power assembly 52 includes a gas turbofan engine 60 engine mounted, or configured to be mounted, to the first wing 22 or the second wing of the aircraft 10. In some embodiments, such as the one illustrated in FIG. 2, the gas turbine engine includes a turbomachine 102 and a propulsor, the propulsor being a fan (referred to as "fan 104" with reference to FIG. 2). Accordingly, for the embodiment of FIG. 2, the gas turbine engine is configured as a turbofan engine 60.

The turbofan engine 60 defines an axial direction A1 (extending parallel to a longitudinal axis 101 provided for reference) and a radial direction R1. As stated, the turbofan engine 60 includes the fan 104 and the turbomachine 102 disposed downstream from the fan 104.

The turbomachine 102 depicted generally includes a substantially tubular outer casing 106 that defines an annular inlet 108. The outer casing 106 encases, in serial flow relationship, a compressor section including a booster or low pressure (LP) compressor 110 and a high pressure (HP) compressor 112; a combustion section 114; a turbine section including a first, high pressure (HP) turbine 116 and a second, low pressure (LP) turbine 118; and a jet exhaust nozzle section 120. The compressor section, combustion section 114, and turbine section together define at least in part an air flowpath 121 through the turbomachine 102.

The turbomachine 102 of the turbofan engine 60 additionally includes one or more shafts rotatable with at least a portion of the turbine section and, for the embodiment depicted, at least a portion of the compressor section. More particularly, for the embodiment depicted, the turbofan engine 60 includes a high pressure (HP) shaft or spool 122, which drivingly connects the HP turbine 116 to the HP compressor 112. Additionally, the turbofan engine 60 includes a low pressure (LP) shaft or spool 124, which drivingly connects the LP turbine 118 to the LP compressor 110.

Further, the fan 104 depicted is configured as a variable pitch fan having a plurality of fan blades 128 coupled to a disk 130 in a spaced apart manner. The fan blades 128 extend outwardly from disk 130 generally along the radial direction R1. Each fan blade 128 is rotatable relative to the disk 130 about a respective pitch axis P1 by virtue of the fan blades 128 being operatively coupled to a suitable actuation member 132 configured to collectively vary the pitch of the fan blades 128. The fan 104 is mechanically coupled to the LP shaft 124, such that the fan 104 is mechanically driven by the second, LP turbine 118. More particularly, the fan 104, including the fan blades 128, disk 130, and actuation member 132, is mechanically coupled to the LP shaft 124 through a power gearbox 134, and is rotatable about the longitudinal axis 101 by the LP shaft 124 across the power gearbox 134. The power gearbox 134 includes a plurality of gears for stepping down the rotational speed of the LP shaft 124 to a more efficient rotational fan speed. Accordingly, the fan 104 is powered by an LP system (including the LP turbine 118) of the turbomachine 102.

Referring still to the embodiment of FIG. 2, the disk 130 is covered by rotatable front hub 136 aerodynamically contoured to promote an airflow through the plurality of fan blades 128. Additionally, the turbofan engine 60 includes an annular fan casing or outer nacelle 138 that circumferentially surrounds the fan 104 and/or at least a portion of the turbomachine 102. Accordingly, the turbofan engine 60 depicted may be referred to as a "ducted" turbofan engine. Moreover, the nacelle 138 is supported relative to the turbomachine 102 by a plurality of circumferentially-spaced outlet guide vanes 140. A downstream section 142 of the nacelle 138 extends over an outer portion of the turbomachine 102 so as to define a bypass airflow passage 144 therebetween.

With further reference to FIG. 2, the hybrid propulsion system 50 additionally includes the first electric machine 62, which for the embodiment depicted is configured as an electric motor/generator. The first electric machine 62 is, for the embodiment depicted, positioned within the turbomachine 102 of the turbofan engine 60, inward of the air flowpath 121, and can be coupled to/in mechanical communication with one of the shafts of the turbofan engine 60. For instance, for the embodiment depicted, the electric machine is coupled to the second, LP turbine 118 through the LP shaft 124. The first electric machine 62 may be configured to convert mechanical power of the LP shaft 124 to electrical power (such that the LP shaft 124 drives the first electric machine 62), or alternatively, the first electric machine 62 may be configured to convert electrical power provided thereto into mechanical power for the LP shaft 124 (such that the first electric machine 62 drives, or assists with driving, the LP shaft 124). Accordingly, the turbomachine 102 may be used to generate electrical power that may be utilized by the propulsion assembly 56, thrust for the aircraft 10, or both.

It will be appreciated that in other embodiments, the first electric machine 62 may instead be positioned at any other suitable location within the turbomachine 102 or elsewhere. For example, the first electric machine 62 may be, in other embodiments, mounted coaxially with the LP shaft 124 within the turbine section, or alternatively, may be offset from the LP shaft 124 and driven through a suitable gear train. Additionally, or alternatively, in other embodiments, the first electric machine 62 may instead be powered by the HP system, e.g., by the HP turbine 116 through, e.g., the HP shaft 122, or by both the LP system (e.g., the LP shaft 124) and the HP system (e.g., the HP shaft 122) via a dual drive system. Additionally, or alternatively, still, in other embodiments, the first electric machine 62 may include a plurality of electric machines, e.g., with one being drivingly connected to the LP system (e.g., the LP shaft 124) and one being drivingly connected to the HP system (e.g., the HP shaft 122). Further, although the first electric machine 62 is described as an electric motor/generator, in other embodiments, the first electric machine 62 may be configured solely as an electric generator.

In various embodiments, the first electric machine 62 may be configured to generate at least about ten kilowatts of electrical power when driven by the turbomachine 102, such as at least about fifty kilowatts of electrical power, such as at least about sixty-five kilowatts of electrical power, such as at least about seventy-five kilowatts of electrical power, such as at least about one hundred kilowatts of electrical power, such as up to five thousand kilowatts of electrical power, such as up to eight hundred and fifty kilowatts of electrical power, such as up to nine hundred kilowatts of electrical power. Additionally, or alternatively, the first electric machine 62 may be configured to provide, or otherwise add, horsepower (hp) of mechanical power to the turbomachine 102 when the first electric machine 62 is provided electrical power from, e.g., the electric energy storage unit 70 of the second power assembly 54. For example, in various embodiments, the first electric machine 62 may be configured to provide at least about fifteen, such as at least about fifty horsepower of mechanical power to the turbomachine 102, such as at least about seventy-five horsepower, such as at least about one hundred horsepower, such as at least about one hundred and twenty horsepower, such as up to about seven thousand horsepower.

Referring still to FIGS. 1 and 2, the turbofan engine 60 further includes a controller 150, such as a FADEC, and a plurality of sensors. The controller 150 of the turbofan engine 60 may be configured to control operation of, e.g., the actuation member 132, the fuel delivery system, etc. Additionally, referring back also to FIG. 1, the controller 150 of the turbofan engine 60 is operably connected to the controller 72 of the hybrid propulsion system 50. Moreover, the controller 72 may further be operably connected to one or more of the first power assembly 52 (including controller 150), the first electric machine 62, the second power assembly 54, the second electric machine 66, the propulsor assembly 56, and the energy storage unit 70 through a suitable wired or wireless communication system (depicted in phantom).

In various embodiments, the turbofan engine 60 may further include one or more sensors positioned to, and configured to, sense data indicative of one or more operational parameters of the turbofan engine 60. For example, the turbofan engine 60 may include one or more temperature sensors configured to sense a temperature within a air flowpath 121 of the turbomachine 102. For example, such sensors may be configured to sense an exhaust gas temperature at an exit of the combustion section 114. Additionally, or alternatively, the turbofan engine 60 may include one or more pressure sensors to sense data indicative of a pressure within the air flowpath 121 of the turbomachine 102, such as within a combustor within the combustion section 114 of the turbomachine 102. Further, in still other embodiments, the turbofan engine 60 may also include one or more speed sensors configured to sense data indicative of a rotational speed of one or more components of the turbofan engine 60, such as one or more of the LP spool 124 or the HP spool 122. Additionally, in various embodiments, the turbofan engine 60, the hybrid propulsion system 50 as a whole, and/or an aircraft 10 incorporating the hybrid propulsion system 50, may include one or more ambient conditions sensors, such as one or more ambient temperature sensors, positioned outside the air flowpath 121 of the turbomachine 102 for sensing data indicative of an ambient condition, such as an ambient temperature. Accordingly, in at least various embodiments, the hybrid propulsion system 50 may receive information regarding one or more ambient conditions from the aircraft 10. Notably, however, in other embodiments, ambient conditions may be sensed within the air flowpath 121 of the turbomachine 102, e.g., at the inlet 108.

It should further be appreciated that the turbofan engine 60 depicted in FIG. 2 may, in other embodiments, have any other suitable configuration. For example, in other embodiments, the fan 104 may not be a variable pitch fan, and further, in other embodiments, the LP shaft 124 may be directly mechanically coupled to the fan 104 (e.g., the turbofan engine 60 may not include the gearbox 134). Further, it should be appreciated that in other embodiments, the turbofan engine 60 may be configured as any other suitable gas turbine engine. For example, in other embodiments, the turbofan engine 60 may instead be configured as a turboprop engine, an unducted turbofan engine, a turbojet engine, a turboshaft engine, etc.

Referring now to FIGS. 1 and 3, as previously stated, the hybrid propulsion system 50 can additionally include the second power assembly 54 mounted, for the embodiment depicted in FIG. 1, to the fuselage 18 (directly or indirectly) and/or one or more of the first and the second wings 22, 24 of the aircraft 10. As illustrated in FIG. 3, in some embodiments, the second power assembly 54 can be generally configured as an internal combustion engine 64 and a propeller. The internal combustion engine 64 defines an axial direction $A_2$ (extending parallel to a longitudinal centerline 162 provided for reference) and a radial direction $R_2$.

In some embodiments, the internal combustion engine 64 includes an engine block 164 that forms the main structure of the internal combustion engine 64 and contains and/or defines many of the internal features of the internal combustion engine 64. The engine block 164 is constructed and arranged to define a crankcase 166 and a plurality of cylinders 168. In the various embodiments, the crankcase 166 is oriented substantially parallel to a longitudinal centerline 162 of the internal combustion engine 64. The crankcase 166 houses a crankshaft 170 that is disposed along the longitudinal centerline 162.

Referring still to FIGS. 1 and 3, the plurality of cylinders 168 can include two to twelve (or more) cylinders, such as four to twelve cylinders, such as four to eight cylinders, and such as six cylinders. The cylinders 168 are arranged so that they extend upward from the crankcase 166. Each cylinder 168 can extend at an angle relative to a radial direction R2 that is perpendicular to the longitudinal centerline. As the number of cylinders 168 is increased, for example to six cylinders, the cylinders 168 can be alternated on opposite sides of the radial direction R2 in a configuration that may be referred to in the art as a "V" configuration, thereby creating a "V-type" internal combustion engine 64 with three cylinders on each side of the internal combustion engine 64. It is understood that two cylinders may be substantially opposed to one another, rather than a full alternated arrangement, to save space.

In various embodiments, each cylinder 168 is constructed to slidably receive a piston 172 that is operatively connected to the crankshaft 170 via a connecting rod 174. Each connecting rod 174 is rotatably connected to one of the pistons 172 at one end portion and rotatably connected to the crankshaft 170 via a pin-type crankshaft journal 176 at the opposite end portion. The pistons 172 reciprocate linearly within the cylinders 168. In turn, the connecting rods 174 convert the linear movement of the pistons 172 into rotational movement of the crankshaft 170, and vice-versa.

In some embodiments, the crankcase 166 can include at least one crank chamber 178, and in various embodiments, the crankcase 166 can include one isolated crank chamber 178 for each pair of substantially opposed cylinders 168. A bore 180 can extend through the crankcase 166 and each of the crank chambers 178. The crankshaft 170 is received by the bore 180. In some examples, a balancing shaft 182 can also extend through the crankcase 166. The balancing shaft 182 is provided to counteract the moment generated by rotation of the crankshaft 170 and the piston assembly which produce mass moment unbalancing of the first order. The balancing shaft 182 and the crankshaft 170 extend through the crankcase 166 in a parallel relationship, as shown in FIG. 3. The balancing shaft 182 is rotatably mounted within a bore 184 that extends through the crankcase 166. Suitable bearing assemblies are provided for smooth rotation of the balancing shaft 182. The balancing shaft 182 is operatively connected to the crankshaft 170 through a gear 186, which may be located within a gearbox 188 at one end portion of the crankcase 166.

In some embodiments, an air intake system 190 can be constructed and arranged to receive air from the environment and deliver the air to intake passageways. A throttle valve 196 can be disposed within an entry of the air intake system 190 and can be controlled by a controller 198. The throttle valve 196 is mechanically or electrically movable to increase or decrease the amount of air that enters air intake system 190, and thus assists in controlling the speed of rotation of the crankshaft 170. It will be appreciated that, in some embodiments, the internal combustion engine 64 can include a turbocharger that can be mounted to the internal combustion engine 64. In such embodiments, the turbocharger can include an internal turbine, which in turn drives a compressor that is used to compress the intake air. Thus, the turbocharger can be designed to increase the pressure of the incoming air to the air intake system 190.

The internal combustion engine 64 described herein can be configured to provide a total engine output of about one hundred and forty to about six hundred horsepower (hp). For example, the total engine output is about one hundred and fifty to about five hundred horsepower, about one hundred and sixty to about four hundred horsepower, about one hundred seventy to about three hundred seventy-five horsepower, and/or about one hundred eighty to about three hundred fifty horsepower. In the various embodiments, the total engine output can be about two hundred twenty horsepower for a naturally aspirated internal combustion engine 64, and about three hundred horsepower for a turbocharged internal combustion engine 64. In some embodiments, the second power assembly 54 (or the internal combustion engine 64) may be configured to rotate and generate electrical power.

In some embodiments, the internal combustion engine 64 may further include a propeller shaft 200 that can be operatively connected to the internal combustion engine 64, and is also operatively connected to a propeller 160. For instance, the propeller shaft 200 is connected to the propeller 160 at one end portion and a gearbox 202, at an opposite end portion. In some embodiments, the gearbox 202 is constructed and arranged to rotate the propeller shaft 200, and hence the propeller 160, at a speed of about one hundred to about three thousand revolutions per minute when the internal combustion engine 64 is operating under normal conditions.

Further, in embodiments including the propeller 160, a variable pitch fan having a plurality of propeller blades 210 may be coupled to a disk 212 in a spaced apart manner. The propeller blades 210 extend outwardly from the disk 212 generally along the radial direction $R_2$. Each propeller blade 210 is rotatable relative to the disk 212 about a respective pitch axis P2 by virtue of the propeller blades 210 being operatively coupled to a suitable actuation member 214 configured to collectively vary the pitch of the propeller blades 210. The propeller 160 is mechanically coupled to the propeller shaft 200, such that the propeller 160 is mechanically driven by the crankshaft. More particularly, the propeller 160, including the propeller blades 210, the disk 212, and the actuation member 214, is mechanically coupled to the crankshaft 170 through the gearbox 202, which can also be referred to as a speed reduction unit or a propeller speed reduction unit. Accordingly, the propeller 160 can be powered by a crankshaft 170 of the internal combustion engine 64.

In some embodiments, the second electric machine 66 may be disposed at one or both end portions of the crankshaft 170. The second electric machine 66 may be configured to convert mechanical power of the crankshaft 170 to electrical power when the crankshaft 170 drives the second electric machine 66 through coupling with the crankshaft 170 or through an additional shaft 216 that rotates with the crankshaft 170. In turn, the electrical power is transmitted from the second electric machine 66 to one or more electric lines 76. Alternatively, the second electric machine 66 may be configured to convert electrical power provided thereto into mechanical power for the crankshaft 170 such that the second electric machine 66 drives, or assists with driving, the crankshaft 170 through the one or more electric lines 76.

It will be appreciated that in some embodiments, the second electric machine 66 may instead be positioned at any other suitable location within the internal combustion engine 64 or elsewhere. For example, the second electric machine 66 may be, in other embodiments, mounted coaxially with the propeller shaft 200 (or coupled with the propeller shaft in lieu of a propeller), or alternatively may be offset from the crankshaft 170 and/or the propeller shaft 200 and driven through a suitable gear train. Further, although the second electric machine 66 is described as an electric motor/generator, in other embodiments, the second electric machine 66 may be configured solely as an electric generator.

Notably, in various embodiments, the second electric machine 66 may be configured to generate at least about ten kilowatts of electrical power when driven by the internal combustion engine 64, such as at least about fifty kilowatts of electrical power, such as at least about sixty-five kilowatts of electrical power, such as at least about seventy-five kilowatts of electrical power, such as at least about one hundred kilowatts of electrical power, such as up to four hundred kilowatts of electrical power.

Referring still to FIGS. 1 and 3, the internal combustion engine 64 further includes a controller 198, which may be a FADEC system, and a plurality of sensors. The controller 198 of the internal combustion engine 64 may be configured to monitor and control many of the operating parameters of the internal combustion engine 64. For example, the controller 198 can monitor and control the air-to-fuel ("air/fuel") ratio, or fuel richness, that is provided to the combustion chambers. This can be done by controlling the amount of fuel that is injected. The controller 198 can additionally or alternatively monitor and control the rotational speed of the crankshaft 170, which can be done by controlling the amount of fuel and air that is provided to the combustion chambers. The controller 198 can also provide propeller pitch control, which allows the internal combustion engine 64 operate more efficiently. Additionally, referring back also to FIG. 1, the controller 198 of the internal combustion engine 64 is operably connected to the controller 72 of the hybrid propulsion system 50.

Referring now particularly to FIGS. 1 and 4, as previously stated the hybrid propulsion system 50 can additionally include the propulsor assembly 56 mounted, for the embodiment depicted in FIG. 1, to the first and second wings 22, 24 of the aircraft 10. As illustrated in FIG. 4, in some embodiments, the propulsor assembly 56 can include an electric motor 240 and at least one aerodynamic propulsor/fan 242/104. The propulsor assembly 56 defines an axial direction A3 extending along a longitudinal centerline axis 244 that extends therethrough for reference, as well as a radial direction R3. For the embodiment depicted, the propulsor 242 is rotatable about the centerline axis 244 by the electric motor 240.

The at least one aerodynamic propulsor 242, in some embodiments, can include a plurality of fan blades 246 and a fan shaft 248. The plurality of fan blades 246 are attached to/rotatable with the fan shaft 248 and spaced generally along a circumferential direction of the propulsor assembly 56. In various embodiments, the plurality of fan blades 246 may be attached in a fixed manner to the fan shaft 248, or alternatively, the plurality of fan blades 246 may be rotatable relative to the fan shaft 248, such as in the embodiment depicted. For example, the plurality of fan blades 246 each define a respective pitch axis P3, and for the embodiment depicted are attached to the fan shaft 248 such that a pitch of each of the plurality of fan blades 246 may be changed, e.g., in unison, by a pitch change mechanism 250. Changing the pitch of the plurality of fan blades 246 may increase an efficiency of the propulsor assembly 56 and/or may allow the propulsor assembly 56 to achieve a desired thrust profile. With such an embodiment, the propulsor 242 may be referred to as a variable pitch fan.

Moreover, for the embodiment depicted, the propulsor assembly 56 depicted additionally includes a fan casing or outer nacelle 252, attached to a core 254 of the propulsor assembly 56 through one or more struts or outlet guide vanes 256. For the embodiment depicted, the outer nacelle 252 substantially completely surrounds the at least one aerodynamic propulsor 242, and particularly the plurality of fan blades 246. Accordingly, for the embodiment depicted, the propulsor assembly 56 may be referred to as a ducted electric fan. In some embodiments, however, the propulsor assembly 56 may be configured as an unducted fan that does not include the outer nacelle 252.

Referring still to FIG. 4, the fan shaft 248 is mechanically coupled to the electric motor 240 within the core 254, such that the electric motor 240 drives the propulsor 242 through the fan shaft 248. The fan shaft 248 is supported by one or more bearings 258, such as one or more roller bearings, ball bearings, or any other suitable bearings. Additionally, the electric motor 240 may be an inrunner electric motor (e.g., including a rotor positioned radially inward of a stator), or alternatively may be an outrunner electric motor (e.g., including a stator positioned radially inward of a rotor), or alternatively, still, may be an axial flux electric motor (e.g., with the rotor neither outside the stator nor inside the stator, but rather offset from it along the axis of the electric motor).

As briefly noted above, the electrical power source (e.g., the first electric machine 62, the second electric machine 66, and/or the electric energy storage unit 70) is electrically connected with the propulsor assembly 56 (e.g., the electric motor 240) for providing electrical power to the propulsor assembly 56. For instance, in some embodiments, the electric motor 240 is in electrical communication with the first electric machine 62, the second electric machine 66, and/or the electric energy storage unit 70 through the electrical power bus 74, and more particularly, through the one or more electrical cables or lines 76 extending therebetween.

Referring still to FIGS. 1 and 4, the propulsor assembly 56 further includes a controller 260, which may be a FADEC system, and a plurality of sensors. The controller 260 of propulsor assembly 56 may be configured to monitor and control many of the operating parameters of the electric motor 240. For example, the controller 260 can monitor and control the rotational speed of the at least one aerodynamic propulsor, the pitch of the at least one aerodynamic propulsor, etc. Additionally, referring back also to FIG. 1, the controller 260 of the propulsor assembly 56 is operably connected to the controller 72 of the hybrid propulsion system 50.

It should be appreciated that in various embodiments the hybrid propulsion system 50 may have any other suitable configuration, and further, may be integrated into an aircraft 10 in any other suitable manner. For example, in other embodiments, the propulsor assembly 56 of the hybrid propulsion system 50 may instead be configured as a plurality of propulsor assemblies 54 that are distributed about the aircraft in any practicable manner while being electrically coupled with the first power assembly 52, the second power assembly 54, the energy storage unit 70, or any combination thereof.

In various embodiments, the electric propulsor assembly(ies) 200, the gas turbine engine(s), the first electric machine(s) 62, the internal combustion engine(s) 64, and the second electric machines 66 may be mounted to the aircraft 10 at any other suitable location in any other suitable manner (including, e.g., tail mounted configurations). For example, in various embodiments, the electric propulsor assembly may be configured to ingest boundary layer air and reenergize such boundary layer air to provide a propulsive benefit for the aircraft 10 (the propulsive benefit may be thrust, or may simply be an increase in overall net thrust for the aircraft 10 by reducing a drag on the aircraft 10).

Figure 5:
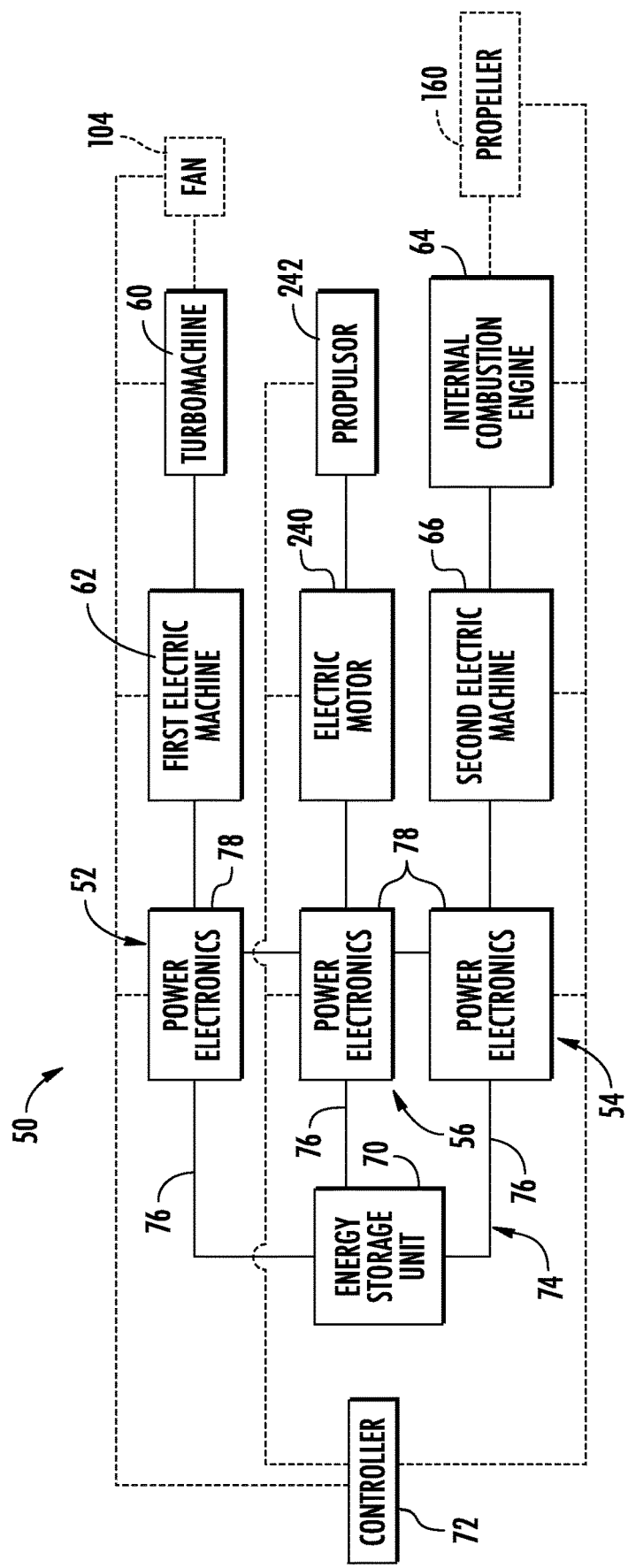
FIG. 5 is a block diagram of the hybrid propulsion system in accordance with various aspects of the present disclosure.
Figure 6:
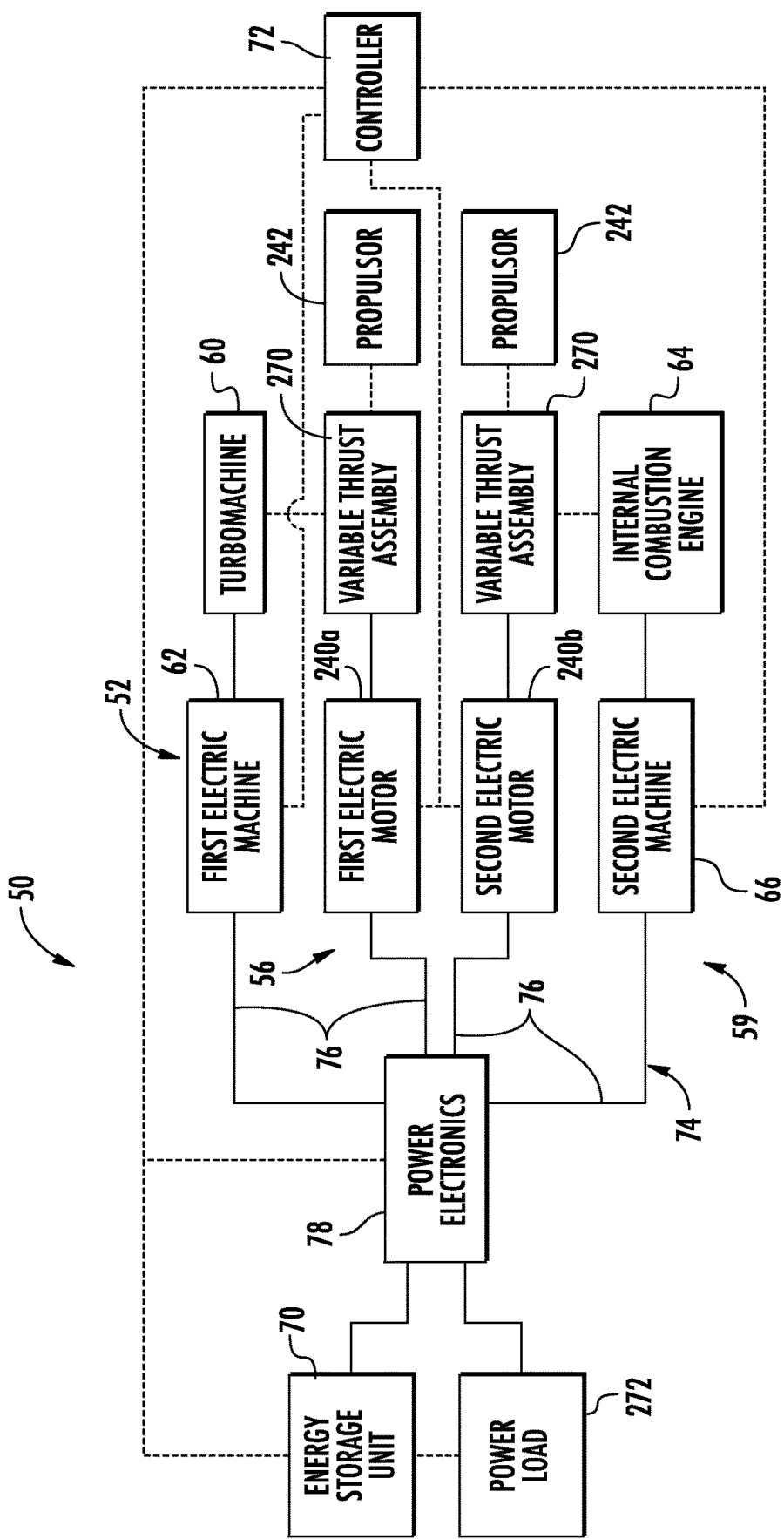
FIG. 6 is a block diagram of the hybrid propulsion system in accordance with various aspects of the present disclosure

Referring to FIGS. 5 and 6, the hybrid propulsion system 50 includes the first electric machine 62, the second electric machine 66, and the electric energy storage unit 70 electrically connectable to the electric motor 240 of the propulsion assembly 56. It will be appreciated that the hybrid propulsion system 50 provided herein may include any number of first power assemblies, second power assemblies, and/or propulsor assemblies located on any portion of the aircraft 10.

The first electric machine 62 is additionally coupled to the turbomachine 102. In such a manner, the first electric machine 62 may extract power from the turbomachine 102 and/or provide power to the first turbomachine 102. The second electric machine 66 is additionally coupled to the internal combustion engine 64. In such a manner, the second electric machine 66 may extract power from the internal combustion engine 64 and/or provide power to the internal combustion engine 64.

With further reference to FIG. 5, in some embodiments, the first power assembly 52 can be configured as a continuous combustion engine, such as a turbine engine, turboprop engine, an unducted turbofan engine 60, a turbojet engine, a turboshaft engine, etc. In various embodiments, the first power assembly 52 may be capable of producing up to three thousand horsepower, such as five hundred horsepower to two thousand five hundred horsepower, such as one thousand horsepower to two thousand horsepower, such as one thousand eight hundred horsepower to two thousand five hundred horsepower.

The first electric machine 62 may be integrated within the first power assembly 52 and configured as motor/generator. In various embodiments, the first electric machine 62 may be configured to generate a first amount of electrical power, which may be up to one megawatt (mW) during operation of the first power assembly 52, such as up to nine hundred kilowatts (kW), such as up to eight hundred fifty kW when operated in a generator mode.

In some embodiments, the second power assembly 54 may be configured as a reciprocating engine and/or a fuel cell assembly that is coupled to the propulsion assembly 56. For example, the second power assembly 54 may be configured as an internal combustion engine 64 that can be configured as a two-stroke engine (e.g., clerk cycle, day cycle, etc.), a Four-stroke engine (e.g., Otto cycle), a six-stroke engine, or any other number of strokes. In addition, the internal combustion engine 64 may be configured as compression-ignition engine and/or a spark-ignition engine. Further, the internal combustion engine 64 may be configured to operate through a mechanical/thermodynamical cycle (e.g., Atkinson cycle, Miller cycle, etc.) and/or a rotary engine (e.g., a Wankel engine). In various embodiments, the second power assembly 54 may be configured to produce up to seven hundred fifty horsepower, such as one hundred to seven hundred horsepower, such as two hundred to five hundred horsepower.

The second electric machine 66 may be operably coupled to the second power assembly 54 and configured as motor/generator. In various embodiments, the second electric machine 66 may be configured to generate a second amount of electrical power, which may be up to eight hundred kW during operation of the first power assembly 52, such as between fifty and five hundred kW, such as between one hundred and four hundred fifty kW, such as between one hundred fifty and three hundred and seventy five kW, or any other practicable range when operated in a generator mode. In some embodiments, the second electric machine 66 may be configured to generate less electrical power than the first electric machine 62. For instance, the second electric machine 66 may generate less than half of the electrical power of the first electric machine 62.

In some embodiments, the first power assembly 52 is drivingly coupled to the first electric machine 62 to produce a first amount of electric power and the second power assembly 54 is drivingly coupled to the second electric machine 66 to produce a second amount of electric power. In some instances, the second power assembly 54 can be configured to generate the second amount of electric power more efficiently than the first power assembly 52 generates the first amount of electric power. For instance, as provided herein, the first power assembly 52 may be a continuous combustion engine 60 (or any other type of engine) that operates at a first efficiency at an idle speed (e.g. 10-60% of maximum output), a second efficiency at an mid-range operating speed (e.g. 50-90% of maximum output), and/or a third efficiency at a maximum output (e.g. 90-100% of maximum output). The second power assembly 54 may be an internal combustion engine 64 (or any other type of engine) that operates at a fourth efficiency at an idle speed (e.g. 10-60% of maximum output), a fifth efficiency at an mid-range operating speed (e.g. 50-90% of maximum output), and/or a sixth efficiency at a maximum output (e.g. 90-100% of maximum output). In some instances, each of the first and second power assemblies 52, 54 may use a combustible fuel in order to operate at the defined efficiencies.

In some instances, the first power assembly 52, when configured as a turbomachine, is most efficient at maximum power output making the third efficiency greater than the first efficiency. Conversely, when operated at lower rotational speeds, the pressure of the compressed air within the first power assembly 52 drops and thus thermal and fuel efficiency drop dramatically within the first power assembly 52. Accordingly, the efficiency of the first power assembly 52 can steadily decline with reduced power output and can be lower in the low power range. Conversely, the fourth, the fifth and the sixth efficiencies may be generally within a predefined percentage (such as 15%) of each other. In some instances, the fourth, the fifth and the sixth efficiencies may be greater than that of the first efficiency and/or less than that of the third efficiency. It is to be understood that the efficiencies provided herein are related to the amount of fuel consumed to generate an amount of propulsion through the propulsor assembly.

Additionally or alternatively, in various embodiments, the first power assembly first power assembly 52 can be configured to operate in a first range of revolutions per minute. The second power assembly 54 is configured to operate in a second range of revolutions per minute that is at least partially less than or greater than the first range of revolutions per minute. In some instances, the variation in revolutions per minute between the first and second power assemblies 52, 54 may be fairly large due to various engine designs between the first and second power assemblies.

Additionally or alternatively, in various embodiments, the first power assembly generates a first noise level while operating at an idle speed, or at any other defined speed, while the second power assembly generates a second noise level while operating at an idle speed, or at any other defined speed. In various embodiments, the first noise level may be greater than the second noise level while operating at a common operating speed and/or operating parameter.

In some embodiments, the propulsor assembly 56 can include one or more electric motors and it will be appreciated that for the embodiment depicted in FIG. 5, the propulsor assembly 56 can be configured as a pure electric propulsor assembly in which the electric motor 240 of the propulsor assembly 56 is coupled independently to a propulsor 242. In other embodiments, such as the one depicted in FIG. 6, the propulsor assembly 56 can be configured as part of a hybrid propulsor in which at least one of the first and/or second power assemblies may turn a common propulsor 242 with at least one electrical motor 240 of the propulsor assembly 56. In various embodiments, the power loading of each electrical motor 240 within the propulsor assembly 56 may be up to twenty pound feet/horsepower (lbf/hp), such as between one to ten pound feet/horsepower, such as between two and eight pound feet/horsepower. In some embodiments, the propulsor assembly 56 may include more than one motor and/or more than one propulsor. Each of the propulsors 242 may be ducted and/or unducted and distributed about the aircraft 10 in any manner. In various embodiments, the propulsor assembly 56 may include any number of motor(s) that may be operably coupled to any one or more propulsors 242. Each of the one or more propulsors 242 may be operably coupled in parallel and/or in series.

In some embodiments, The first and the second power assemblies 52, 54 are powered in parallel. Additionally or alternatively, the first and the second power assemblies 52, 54 are powered in parallel. Accordingly, the disparate first and the second power assemblies 52, 54 may be coupled in series electric transfer as well as parallel for transferring power based on a mechanical coupling of the first and the second power assemblies 52, 54 to one another. For example, the first power assembly 52 may provide power to the power electronics 78 through the first electric machine 62 and/or through rotation of the second electric machine 66. Likewise, the second power assembly 54 may provide power to the power electronics 78 through the second electric machine 66 and/or through rotation of the first electric machine 62 that is operably coupled with the first power assembly 52.

As is also depicted in FIG. 5, the hybrid propulsion system 50 further includes a controller 72 and a power bus 74. Various components of the first power assembly 52, the second power assembly 54, the propulsor assembly 56, and the electric energy storage unit 70 are each electrically connectable to one another through one or more electric lines 76 of the power bus 74. For example, the power bus 74 may include various switches or other power electronics 78 movable to selectively electrically connect the various components of the hybrid propulsion system 50, and optionally to convert or condition such electrical power transferred therethrough. Accordingly, in certain operations, the first electric machine 62 may provide electrical power to the propulsor assembly 56, or vice versa. Further, in certain operations, the first electric machine 62 may provide electrical power to the second electric machine 66 and/or the second power assembly 54, or vice versa. Likewise, in certain operations, the second power assembly 54 and/or the second electric machine 66 may provide electrical power to the propulsor assembly 56, or vice versa. Additionally, or alternatively, the first electric machine 62 and/or the second electric machine 66 may provide electrical power to the electric energy storage unit 70, or the electric energy storage unit 70 may provide electrical power to the first power assembly 52, the second power assembly 54, and/or the propulsor assembly 56. In various embodiments various configurations of thrust outputs may occur when each power assembly 52, 54 is switched on or off, based on the system 50 power demand, and each power assembly 52, 54 can be throttled back while another power assembly 52, 54 is brought up to speed during the power transition.

With reference to FIG. 6, the hybrid propulsion system 50 can include one or more propulsors 242 that are operably coupled to more than one of the first power assembly 52, the second power assembly 54, and/or the propulsor assembly 56. For example, in some embodiments, a propulsor 242 may be operably coupled with the first power assembly 52 and the propulsor assembly 56. In some embodiments, the propulsor 242 may additionally be operably coupled with the second power assembly 54. Alternatively, in some embodiments, the propulsor 242 may be coupled with the second power assembly 54 and the propulsor assembly 56. Additionally, or alternatively, a first propulsor 242 may be coupled with the first power assembly 52 and the propulsor assembly 56 while a second propulsor 242 is operably coupled with the second power assembly 54 and the propulsor assembly 56.

One or more variable thrust assemblies 270 may be positioned within the hybrid propulsion system 50 to allow for selective coupling of the at least one aerodynamic propulsor(s) 242 to one or more of the power assemblies 52, 54 and the propulsion assembly(ies) 56. For instance, in various embodiments, the variable thrust assemblies 270 may be configured as a clutch assembly and/or a pitch change mechanism 250 (FIG. 4). In some embodiments, the propulsor assembly 56 may rotate the propulsor 242 through the variable thrust assembly 270 while the first and/or second power assemblies 52, 54 are disengaged from the fan. While disengaged, the first and/or second power assemblies 52, 54 may continue to generate electrical power through the respective first and second electric machines 62, 66. The generated electrical power may be used by the propulsor assembly 56, provided to the energy storage unit 70, and/or used by one or more power loads 272 of the aircraft 10.

As depicted in FIG. 6, each of the first power assembly 52, the second power assembly 54, and the propulsor assembly 56 may be operably coupled to the controller 72 and one or more common power electronics 78. In some instances, the power electronics 78 can be configured, for example, to provide or enable power conversion operations (e.g. AC to DC conversion, DC to AC conversion, a first DC power to a second DC power, etc.) to selectively enable or disable the delivery of power to one or more particular propulsor assemblies and/or power loads 272, depending on, for example, available power distribution supply, criticality of electrical load functionality, or aircraft mode of operation, such as take-off, cruise, loiter, or ground operations.

Figure 7:
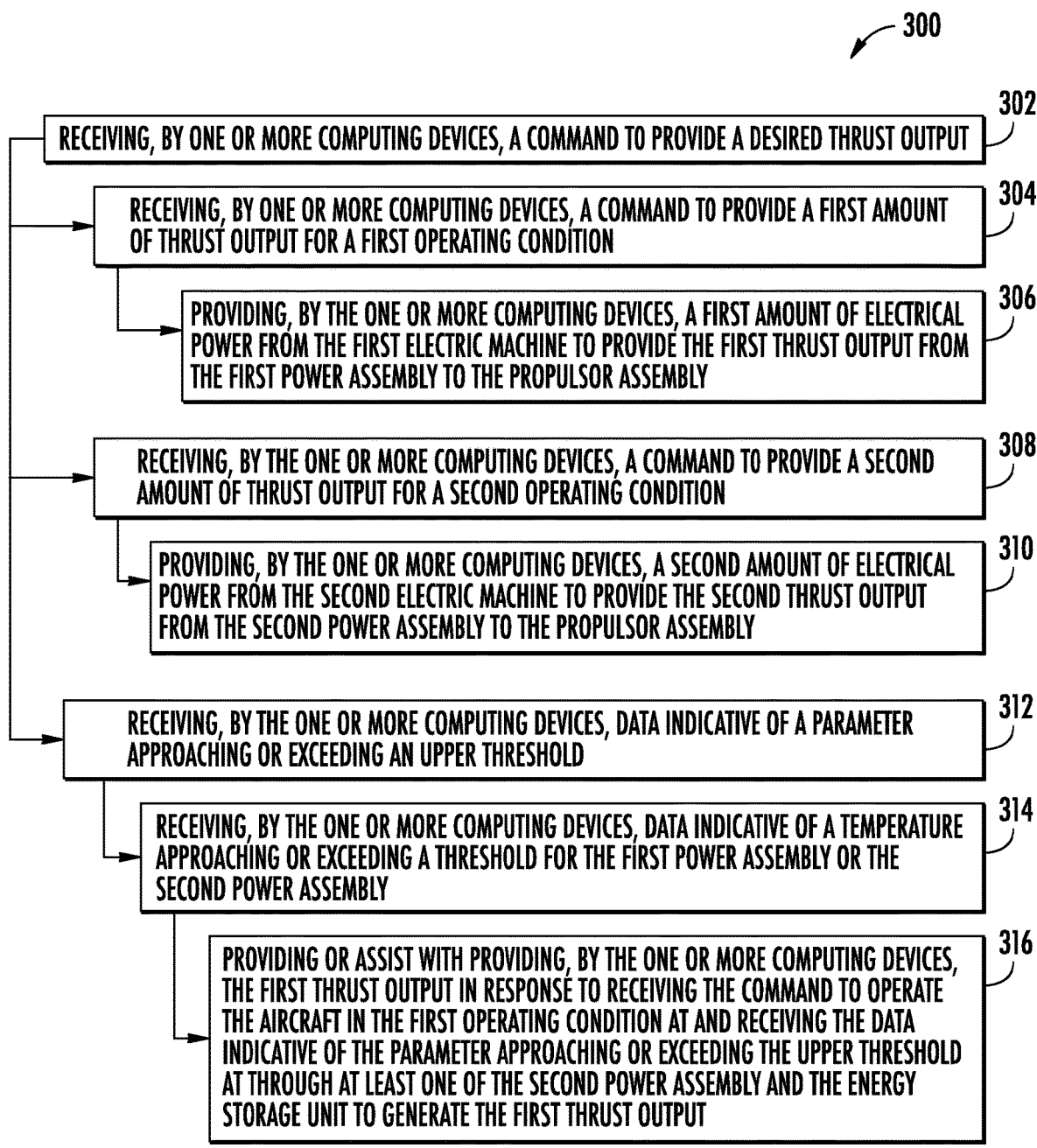
FIG. 7 is a flow diagram of a method for operating a hybrid propulsion system of an aircraft in accordance with various aspects of the present disclosure.

Referring now to FIG. 7, a flow diagram of a method 300 for operating a hybrid propulsion system 50 of an aircraft 10 is provided. The method 300 may generally be operable with one or more of the hybrid propulsion systems 50 described above with reference to FIGS. 1 through 6. For example, the hybrid propulsion system 50 may generally include a first power assembly 52 operably coupled with a first electric machine 62, a second power assembly 54 operably coupled with a second electric machine 66, and a propulsor assembly 56 including a propulsor 242. In some instances, the propulsor assembly 56 can be operably coupled to at least one of the first electric machine 62 and the second electric machine 66.

As is depicted, the method 300 includes at (302) receiving, by one or more computing devices, a command to provide a desired thrust output. In some instances, receiving, by the one or more computing devices, the command to provide the desired thrust output at (302) includes at (304) receiving, by one or more computing devices, a command to provide a first amount of thrust output for a first operating condition. In various instances, the first operating condition may include a pre-level flight condition, such as a takeoff flight condition or a climb flight condition. In such instances, at (306), the method includes providing, by the one or more computing devices, a first amount of electrical power from the first electric machine 62 to provide the first thrust output from the first power assembly 52 to the propulsor assembly 56.

In some instances, receiving, by the one or more computing devices, the command to provide the desired thrust output at (302) includes at (308) receiving, by the one or more computing devices, a command to provide a second amount of thrust output for a second operating condition. In various embodiments, the second operating condition can be indicated by a command to operate the aircraft 10 in a cruise condition, an idle condition, a loiter condition. In such instances, at (310), the method includes providing, by the one or more computing devices, a second amount of electrical power from the second electric machine 66 to provide the second thrust output from the second power assembly 54 to the propulsor assembly 56.

In some instances, if the desired thrust output is within a second power assembly operating range, which may be indicative of a cruise condition and/or a loiter condition, the second power assembly 54 may be activated. For instance, in some embodiments, the internal combustion engine 64 of the second power assembly 54 may operate in a defined range of revolutions per minute (rpm) while functioning in the second power assembly operating range. Further, the second power assembly operating range may alternatively be defined as any operating parameter of the internal combustion engine 64 that can monitor the operation thereof and generally ensure that the internal combustion engine 64 is operating in a manner that is consistent with operating the internal combustion engine 64 in a defined range for that parameter. Moreover, in some instances, the first amount of electrical power can be greater than a maximum electrical power output of the second power assembly 54.

If the desired thrust output is greater than the second power assembly operating range, which may be indicative of a pre-cruise flight condition, including a takeoff flight condition, a climb flight condition, or any other high-speed conditions, the first power assembly 52 may be activated. In some embodiments, the first power assembly 52 may be deactivated when the aircraft 10 is in the second operating condition or when the desired thrust output is within the second power assembly operating range.

The method 300 can further includes at (312) receiving, by the one or more computing devices, data indicative of a parameter approaching or exceeding an upper threshold. Notably, as used herein, the term "approaching or exceeding" refers to a parameter value being within a predetermined range of a threshold, or being above the threshold. In certain aspects, such as the aspect depicted, receiving, by the one or more computing devices, data indicative of the parameter approaching or exceeding the upper threshold at (312) includes at (314) receiving, by the one or more computing devices, data indicative of a temperature approaching or exceeding a threshold for the first power assembly 52 or the second power assembly 54. The temperature threshold may be a temperature threshold above which the first power assembly 52 is limited in an amount of effective output power it may produce by virtue of the ingested ambient air being too hot. However, in other aspects of the present disclosure, the temperature parameter may be any other suitable temperature parameter. For example, the temperature parameter may include an exhaust gas temperature parameter approaching or exceeding an upper exhaust gas temperature parameter threshold.

Moreover, the aspect depicted further includes at (316) providing or assist with providing, by the one or more computing devices, the first thrust output in response to receiving the command to operate the aircraft 10 in the first operating condition at (304) and receiving the data indicative of the parameter approaching or exceeding the upper threshold at (312) through at least one of the second power assembly 54 and the energy storage unit 70 to generate the first thrust output.

By providing the electrical power to the propulsion assembly 56 in accordance with one or more aspects of the present disclosure, the hybrid propulsion system 50 may provide the desired thrust output in a more efficient manner from the first and/or second power assembly 52, 54 to the propulsor assembly 56.

By operating in accordance with one or more these aspects, the hybrid propulsion system 50 provided in FIGS. 1-6 and/or the method 300 provided in FIG. 7 may provide a sufficient amount of thrust output to the aircraft at each operation mode of the aircraft (e.g., takeoff, cruise, loiter, etc.) while operating in an efficient manner. For instance, the hybrid propulsion system 50 provided herein may use a first power assembly 52 that incorporates a lightweight, high specific power engine for takeoff and/or dash conditions (e.g., a constant combustion engine) and a second power assembly 54 that incorporates a high efficiency, low specific power engine for long-duration cruise/loiter conditions (e.g., an intermittent combustion engine). In addition, the hybrid propulsion system may further incorporate a propulsor assembly 56 that uses a partial or full electrical drive-train that can enable the combination of power from disparate plants in order to drive one or more propulsors. In various embodiments, through one or more computing systems, various configurations of thrust outputs may occur when each propulsor assembly is switched on or off, based on the system power demand, and each propulsor assembly can be throttled back while another propulsor assembly is brought up to speed during the power transition.

Figure 8:
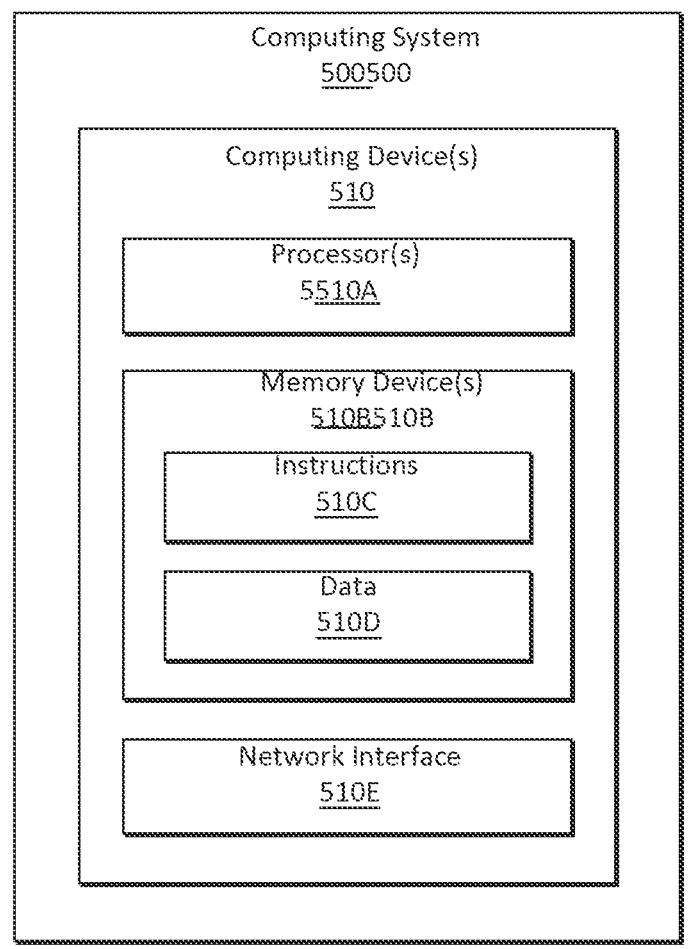
FIG. 8 is a computing system in accordance with various aspects of the present disclosure.

Referring now to FIG. 8, an example computing system 500 according to example embodiments of the present disclosure is depicted. The computing system 500 can be used, for example, as a controller 72 in a hybrid propulsion system 50, the controller 150 of the first power assembly 52, the controller 198 of the second power assembly 54, and/or the controller 260 of the propulsor assembly 56. The computing system 500 can include one or more computing device(s) 510. The computing device(s) 510 can include one or more processor(s) 510A and one or more memory device(s) 510B. The one or more processor(s) 510A can include any suitable processing device, such as a microprocessor, microcontroller, integrated circuit, logic device, and/or other suitable processing device. The one or more memory device(s) 510B can include one or more computer-readable media, including, but not limited to, non-transitory computer-readable media, RAM, ROM, hard drives, flash drives, and/or other memory devices.

The one or more memory device(s) 510B can store information accessible by the one or more processor(s) 510A, including computer-readable instructions 510C that can be executed by the one or more processor(s) 510A. The instructions 510C can be any set of instructions that when executed by the one or more processor(s) 510A, cause the one or more processor(s) 510A to perform operations. In some embodiments, the instructions 510C can be executed by the one or more processor(s) 510A to cause the one or more processor(s) 510A to perform operations, such as any of the operations and functions for which the computing system 500 and/or the computing device(s) 510 are configured, the operations for operating one or more propulsor assemblies (e.g., method 300), as described herein, and/or any other operations or functions of the one or more computing device(s) 510. Accordingly, the method 300 may be computer-implemented methods. The instructions 510C can be software written in any suitable programming language or can be implemented in hardware. Additionally, and/or alternatively, the instructions 510C can be executed in logically and/or virtually separate threads on processor(s) 510A. The memory device(s) 510B can further store data 510D that can be accessed by the processor(s) 510A. For example, the data 510D can include data indicative of power flows, data indicative of power demands of various loads in a hybrid propulsion system, data indicative of operational parameters of the hybrid propulsion system, including of a propulsor assemblies of the hybrid propulsion system.

The computing device(s) 510 can also include a network interface 510E used to communicate, for example, with the other components of system 500 (e.g., via a network). The network interface 510E can include any suitable components for interfacing with one or more network(s), including for example, transmitters, receivers, ports, controllers, antennas, and/or other suitable components. One or more external display devices (not depicted) can be configured to receive one or more commands from the computing device(s) 510.

Further aspects of the present disclosure may be provided in the following clauses:

A hybrid propulsion system for an aircraft comprising: a propulsor assembly having at least one aerodynamic propulsor; a power generation system comprising at least a first power assembly, a second power assembly, a first electric machine, and a second electric machine, the first power assembly drivingly coupled to the first electric machine to produce a first amount of electric power and the second power assembly drivingly coupled to the second electric machine to produce a second amount of electric power, wherein the second power assembly is configured to generate electric power more efficiently than the first power assembly; an power bus coupled to the first electric machine and the second electric machine; and a controller operably coupled to the first power assembly, the first electric machine, or both and to the second power assembly, the second electric machine, or both, the controller and the power bus configured to combine at least a portion of the first amount of electrical power and the second amount of electrical power to supply to the propulsor assembly.

The hybrid propulsion system of one or more of these clauses, wherein the first power assembly includes a turbomachine and the second power assembly includes an internal combustion engine.

The hybrid propulsion system of one or more of these clauses, wherein the controller is further configured to provide electrical power from the first electric machine to the propulsor assembly in a first operating condition and from the second power assembly to the propulsor assembly in a second operating condition.

The hybrid propulsion system of one or more of these clauses, further comprising: an energy storage unit operably coupled with each of the first power assembly, the second power assembly, and the propulsor assembly.

The hybrid propulsion system of one or more of these clauses, wherein each of the first power assembly, the second power assembly, and the propulsor assembly are configured to utilize electrical power stored in the energy storage unit.

The hybrid propulsion system of one or more of these clauses, wherein the second power assembly is configured to generate less electrical power than the first electric machine.

The hybrid propulsion system of one or more of these clauses, wherein the first operating condition is indicated by a command to accelerate or climb the aircraft and the second operating condition is indicated by a command for the aircraft to operate in a level flight condition.

The hybrid propulsion system of one or more of these clauses, wherein the second power assembly generates less than half of the electrical power of the first electric machine.

The hybrid propulsion system of one or more of these clauses, wherein the controller is further configured to receive a desired thrust output, and if the desired thrust output is within a second power assembly operating range, activate the second power assembly, and if the desired thrust output is greater than the second power assembly operating range, activate the first power assembly.

The hybrid propulsion system of one or more of these clauses, wherein the first operating condition is indicated by a command to accelerate or climb the aircraft and the second operating condition is indicated by a command for the aircraft to operate in a level flight condition.

The hybrid propulsion system of one or more of these clauses, further comprising: one or more power electronics positioned between the first power assembly and the power bus, the second power assembly and the power bus, or both.

The hybrid propulsion system of one or more of these clauses, wherein the first power assembly generates a first noise level and the second power assembly generates a second noise level while operating at a common speed and/or operating parameter, and wherein the first noise level is greater than the second noise level.

A method for operating a hybrid propulsion system of an aircraft, the hybrid propulsion system comprising a first power assembly operably coupled with a first electric machine, a second power assembly operably coupled with a second power assembly, and a propulsor assembly, the propulsor assembly comprising at least one aerodynamic propulsor and operably coupled to at least one of the first electric machine and the second electric machine, the method comprising: receiving, by one or more computing devices, a command to provide a first amount of thrust output for a first operating condition; providing, by the one or more computing devices, a first amount of electrical power from the first electric machine to provide the first thrust output from the first power assembly to the propulsor assembly; receiving, by the one or more computing devices, a command to provide a second amount of thrust output for a second operating condition; and providing, by the one or more computing devices, a second amount of electrical power from the second electric machine to provide the second thrust output from the second power assembly to the propulsor assembly.

The method of one or more of these clauses, wherein the first power assembly is configured to operate in a first range of revolutions per minute and the second power assembly is configured to operate in a second range of revolutions per minute that is at least partially less than or greater than the first range of revolutions per minute.

The method of one or more of these clauses, wherein the first operating condition is a takeoff flight condition or a climb flight condition.

The method of one or more of these clauses, wherein the second power assembly is configured to generate the second amount of electric power more efficiently than the first power assembly generates the first amount of electric power.

A hybrid propulsion system for an aircraft comprising: a first power assembly having a turbomachine coupled to a first electric machine; a second power assembly having an internal combustion engine coupled to a second electric machine; a propulsor assembly having a first motor operably coupled to a first propulsor, wherein the propulsor assembly is selectively powered by the first and second electric machines; an power bus coupled to the first electric machine and the second electric machine; and a controller operably coupled to the first power assembly, the first electric machine, or both and to the second power assembly, the second power assembly, or both, wherein, if a desired thrust output is within a second power assembly operating range, the second power assembly is activated, and if the desired thrust output is greater than the second power assembly operating range, the first power assembly is activated.

The hybrid propulsion system of one or more of these clauses, wherein the desired thrust output is greater than the second power assembly operating range during a first operating condition, the first operating condition including a takeoff flight condition or a climb flight condition.

The hybrid propulsion system of one or more of these clauses, further comprising: an energy storage unit operably coupled with each of the first power assembly, the second power assembly, and the propulsor assembly.

The hybrid propulsion system of one or more of these clauses, wherein the propulsor assembly further comprises a second motor operably coupled to a second propulsor, wherein the first and the second propulsor assemblies are powered in parallel.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hybrid propulsion system for an aircraft, comprising:
 a propulsor assembly including a first electric motor operably coupled with at least one propulsor;
 a first power assembly drivingly coupled to a first electric machine to produce a first amount of electric power, the first power assembly comprising a turbomachine including a fan;
 a second power assembly drivingly coupled to a second electric machine to produce a second amount of electric power, the second power assembly including one or more cylinders each configured to receive a piston, the piston operatively connected to a crankshaft, wherein the second power assembly is configured to generate electric power more efficiently than the first power assembly;
 power electronics operably coupled with the first electric machine and the second electric machine in parallel, the power electronics configured to enable power conversion operations from the first electric machine and the second electric machine and transfer power between the first electric machine and the second electric machine, wherein the power electronics are configured to combine at least a portion of the first amount of electrical power and the second amount of electrical power to supply the propulsor assembly; and
 a controller operably coupled to the first power assembly, the first electric machine, or both, and to the second power assembly, the second electric machine, or both, wherein the controller is further configured to direct electrical power from the first electric machine to the propulsor assembly in a first operating condition and from the second power assembly to the propulsor assembly in a second operating condition, wherein the controller is configured to throttle the first power assembly or the second power assembly while the other of the first power assembly or the second power assembly is brought up to speed during a power transition.

2. The hybrid propulsion system of claim 1, further comprising:
   an energy storage unit operably coupled with each of the first power assembly, the second power assembly, and the propulsor assembly.

3. The hybrid propulsion system of claim 2, wherein each of the first power assembly, the second power assembly, and the propulsor assembly are configured to utilize electrical power stored in the energy storage unit.

4. The hybrid propulsion system of claim 1, wherein the second power assembly is configured to generate less electrical power than the first electric machine.

5. The hybrid propulsion system of claim 1, wherein the first operating condition is indicated by a command to accelerate or climb the aircraft and the second operating condition is indicated by a command for the aircraft to operate in a level flight condition.

6. The hybrid propulsion system of claim 1, wherein the second power assembly generates less than half of the electrical power of the first electric machine.

7. The hybrid propulsion system of claim 1, wherein the controller is further configured to receive a desired thrust output, and if a desired thrust output is within a second power assembly operating range, activate the second power assembly, and if the desired thrust output is greater than the second power assembly operating range, activate the first power assembly.

8. The hybrid propulsion system of claim 1, wherein the first power assembly is configured to operate in a first range of revolutions per minute and the second power assembly is configured to operate in a second range of revolutions per minute, the first range of revolutions per minute varied from the second range of revolutions per minute.

9. The hybrid propulsion system of claim 1, wherein the first power assembly is configured to generate a first noise level and the second power assembly is configured to generate a second noise level while operating at a common operating parameter, and wherein the first noise level is greater than the second noise level.

* * * * *